(12) United States Patent
Waisbard et al.

(10) Patent No.: US 8,176,546 B2
(45) Date of Patent: May 8, 2012

(54) TIME INFORMATION MANAGEMENT SYSTEM

(75) Inventors: Erez Waisbard, Or-Yehuda (IL); Hillel Solow, Beit Shemesh (IL)

(73) Assignee: NDS Limited, Staines, Middlesex (GB)

( * ) Notice: Subject to any disclaimer, the term of this patent is extended or adjusted under 35 U.S.C. 154(b) by 554 days.

(21) Appl. No.: 12/227,193

(22) PCT Filed: May 9, 2007

(86) PCT No.: PCT/IL2007/000561
§ 371 (c)(1),
(2), (4) Date: Dec. 15, 2008

(87) PCT Pub. No.: WO2007/148319
PCT Pub. Date: Dec. 27, 2007

(65) Prior Publication Data
US 2009/0133116 A1    May 21, 2009

Related U.S. Application Data

(60) Provisional application No. 60/815,084, filed on Jun. 20, 2006.

(51) Int. Cl.
*H04L 29/06* (2006.01)
(52) U.S. Cl. .......................................... 726/19; 370/347
(58) Field of Classification Search .................... 726/19; 370/347
See application file for complete search history.

(56) References Cited

U.S. PATENT DOCUMENTS

| | | | |
|---|---|---|---|
| 6,347,084 B1 * | 2/2002 | Hulyalkar et al. ............ 370/347 |
| 6,728,880 B1 | 4/2004 | Sites | |
| 6,742,048 B1 | 5/2004 | Walsh | |
| 7,533,266 B2 * | 5/2009 | Bruekers et al. ............... 713/176 |
| 7,693,838 B2 * | 4/2010 | Morgan et al. ................. 707/781 |
| 2005/0181761 A1 | 8/2005 | Park | |
| 2006/0036579 A1 * | 2/2006 | Byrd et al. ......................... 707/3 |
| 2006/0107042 A1 | 5/2006 | Kohmoto | |
| 2006/0242326 A1 | 10/2006 | Camiel | |

FOREIGN PATENT DOCUMENTS

| | | |
|---|---|---|
| EP | 0 807 873 A1 | 11/1997 |
| EP | 1 081 577 A2 | 3/2001 |
| EP | 1 376 304 A2 | 1/2004 |
| EP | 1 562 101 A2 | 8/2005 |

(Continued)

OTHER PUBLICATIONS

Apr. 1, 2009 Office Communication in connection with EP 07 736 301.8-2212.

(Continued)

*Primary Examiner* — Vivek Srivastava
*Assistant Examiner* — Michael D Anderson
(74) *Attorney, Agent, or Firm* — Husch Blackwell LLP

(57) ABSTRACT

A rights validator system for controlling access to content, the system including a query processor to receive a rights query and to provide a result to the rights query based on an estimated time, and a time-based query response module operationally connected to the query processor, the time-based query response module being operative to determine the estimated time as a function of a most recently updated time, and a plurality of indications of elapsed time since the most recently updated time, the indications of elapsed time being from a plurality of different sources of time indication. Related apparatus and methods are also included.

29 Claims, 3 Drawing Sheets

FOREIGN PATENT DOCUMENTS

| EP | 1 679 633 A1 | 7/2006 |
|---|---|---|
| WO | WO 2004/075525 A1 | 9/2004 |
| WO | WO 2004/084048 A1 | 9/2004 |

OTHER PUBLICATIONS

David L. Mills, "Internet Time Synchronization: The Network Time Protocol", IEEE Transactions on Communications, vol. 39, No. 10, Oct. 1991, pp. 1482-1493; Available on the World Wide Web at: http://74.125.77.132/search?q=cache;kZ2nm6A3ZScJ:infolab.stanford.edu/~manku/quals/zpapers/91ntp.pdf.qz+internet+time+synchronization:+The+Network+Time+Protocol&hl=en&ct=elnk&cd=2&gl=il.

David L. Mills, "Network time Protocol (Version3) Specification, Implementation and Analysis", Network Working Group Request for Comments: 1305 (Mar. 1992) (pp. I-VII, 1-113); Available on the World Wide Web at: http://www.faqs.org/ftp.rfc/rfc1305.pdf.

"SVP Open Content Protection System—Technical Overview" (Secure Video Processor, Jan. 3, 2005); Available on the World Wide Web at: http//www.svpalliance.org/docs/e2e_technical_introduction.pdf.

\* cited by examiner

TIME INFORMATION MANAGEMENT SYSTEM

The present application is a 35 USC §371 application of PCT/IL2007/000561, filed on 9 May 2007 and entitled "Time Information Management System", which was published on 27 Dec. 2007 in the English language with International Publication Number WO 2007/148319 and which relies for priority on U.S. Provisional Patent Application No. 60/815,084, filed on 20 Jun. 2006.

The present invention relates to systems and methods for managing time information, particularly, but not exclusively, in the context of digital rights management (DRM) systems.

BACKGROUND OF THE INVENTION

Various devices, such as, by way of a non-limiting example, smart cards, SIMs, and so on, comprise electronic circuitry and memory, and do not comprise a power source. Such devices may comprise hardware or software implementations of programs which depend on time data.

One such device, by way of a non-limiting example, is a SIM card providing DRM services to a cell phone handset. Such a device generally does not advance time when the device is cut off from power, such as when the SIM card is withdrawn from the handset. When the device regains electric power, the device can update time by communicating with a time source, such as a timer kept in the handset. Additionally, both the SIM card and the handset may be cut off from power, when a cell phone handset battery is withdrawn from the cell phone handset. Upon reinserting the battery into the cell phone handset, the cell phone handset typically asks a user whether to update time, the time update being typically performed by communicating with a time source provided by the cell phone service company.

SUMMARY OF THE INVENTION

The present invention seeks to provide improved systems and methods for managing time information, particularly, but not exclusively, in the context of digital rights management (DRM) systems.

A typical example of using a preferred embodiment of the present invention is a cell phone handset, storing a DRM-protected video clip, and a digital rights validation module within a SIM (Subscriber Identity Module) card associated with the cell phone handset. The digital rights validation module comprises DRM rules and a DRM query processor in order to allow or prevent use of the DRM-protected video clip.

Typical DRM rules associated with use of DRM-protected video clips, are, by way of non-limiting examples, rules such as: "do not allow use before such-and-such release date"; and "do not allow use after user's subscription elapses". The examples above depend on time.

Time kept by a SIM card is not necessarily to be trusted. The SIM card is occasionally removed from the cell phone handset, at the same time also being detached from a power supply. Upon reinsertion into the cell phone handset, the SIM card is reconnected to the power supply, typically without having measured elapsed time while being disconnected from the power supply.

Time kept by a cell phone handset is also not necessarily to be trusted. Typically, a user sets the time of the handset to whatever time the user wishes, using a user interface, thereby being enabled to "spoof" the handset and the associated SIM card.

Non-limiting examples of devices in which time can be "spoofed" are: cell phone handsets; personal, laptop, and pocket computers; PDAs; video recorders; and so on.

Preferred embodiments of the present invention comprise a rights validator, the rights validator comprising a DRM query processor enabled to receive rights queries and transmit results of the rights queries. The rights validator comprises a DRM query processor, in operative communication with a DRM rules base and a time-based query response module, as will be described in more detail below, with reference to FIG. 1.

The present invention associates a degree of certainty with time measurements provided by a source of time measurement. The degree of certainty is not expressed as an exact probability, since the likelihood that the source of time measurement has been "spoofed" is not typically known, and at best the likelihood may be approximated.

The present invention, in preferred embodiments thereof, computes an estimated time, based at least in part on a sum of a Most Recently Updated Trusted Time (MRUTT) from a trusted time source, and a function combining estimates of elapsed time since the MRUTT. When more than one trusted time source is available, it is to be appreciated that the most recently updated trusted time is preferably used. The estimates of elapsed time are based on indications of elapsed time from any one of several sources of time-related data. Preferably, the function combining the estimates of elapsed time is a weighted average of the estimates of elapsed time. It is to be appreciated that a weighted average of the estimates from more than one source is likely to mitigate the effect of hackers "spoofing" the one source.

Preferably, the function combining the estimates of elapsed time since the MRUTT is also dependent on how much time has elapsed since the MRUTT.

The present invention, in preferred embodiments thereof, also computes a degree of certainty and associates the degree of certainty with the estimated time. The degree of certainty is based, at least in part, on a function combining degrees of certainty which are each associated with each of the sources of time-related data. One preferred embodiment of the present invention computes the degree of certainty based on a weighted average of degrees of certainty associated with the sources of time-related data.

Preferably, the function combining the degrees of certainty associated with the sources of time-related data is also dependent on how much time has elapsed since the MRUTT.

The estimated time preferably takes into account not only various untrusted time sources, but also a measurement of significant events. By way of a non-limiting example, a SIM card tracks a number of phone calls made since a trusted time update, and also tracks how many times power was reset, a cumulative duration of phone calls, and so on. Phone calls and power resets are typical significant events, and the cumulative duration of phone calls is significant data derived from the significant events. The significant events and the significant data derived from the significant events provide data which serves as a source for time estimates. Relative weights associated with time estimates associated with each event are preferably adjusted over time. By way of a non-limiting example, a preferred embodiment of the present invention "learns" an average number of calls which a user makes per hour, by tracking the number of phone calls and elapsed time. The average is used later on to estimate how many hours have passed since a trusted time update by measuring how many calls have been made since the trusted time update.

A preferred embodiment of the present invention preferably keeps a running average and a variance of the above-mentioned data, and uses the running average and the variance to calculate degrees of certainty of time estimates.

A field of art named "fuzzy logic" deals with reasoning that is approximate rather than precise. Fuzzy logic deals with degrees of truth, which represent membership in vaguely defined sets, and not in probabilities of some event or condition. Typical applications of fuzzy logic characterize subranges of a continuous variable, such as for examples a continuous variable ranging from 0 to 1, corresponding to a range from "false" to "true".

The present invention, in preferred embodiments thereof, uses heuristics, accepting as input a time-related rights query and various available time-related parameters and provides an answer to the time-related rights query. Typically, the time-related rights query relates to Digital Rights Management: the time-related rights query relates to whether a particular type of digital operation is permitted; and the answer is a yes or no answer.

An alternative preferred embodiment of the present invention uses heuristics, accepting as input a time-related query and various available time-related parameters, and provides an answer comprising time-related information and a degree of certainty associated with the time-related information.

It is to be appreciated that a typical use of the time-related information and the degree of certainty associated with the time-related information is in digital rights management systems.

Therefore, there is provided in accordance with a preferred embodiment of the present invention, a rights validator system for controlling access to content, the system including a query processor to receive a rights query and to provide a result to the rights query based on an estimated time, and a time-based query response module operationally connected to the query processor, the time-based query response module being operative to determine the estimated time as a function of a most recently updated time, and a plurality of indications of elapsed time since the most recently updated time, the indications of elapsed time being from a plurality of different sources of time indication.

Further in accordance with a preferred embodiment of the present invention the most recently updated time is a trusted time.

Still further in accordance with a preferred embodiment of the present invention the most recently updated time is digitally signed.

Additionally in accordance with a preferred embodiment of the present invention the time-based query module is operative to determine the estimated time as a function of the most recently updated time, and an average of the indications of elapsed time since the most recently updated time.

Moreover in accordance with a preferred embodiment of the present invention the time-based query module is operative to determine the average of the indications as a weighted average based on a plurality of weights associated with each of the indications of elapsed time.

Further in accordance with a preferred embodiment of the present invention the time-based query module is operative to determine the weights based on a degree of certainty of each of the indications of elapsed time.

Still further in accordance with a preferred embodiment of the present invention the query processor is operative to provide a result to the rights query based on the estimated time and a degree of certainty of the estimated time.

Additionally in accordance with a preferred embodiment of the present invention the time-based query module is operative to determine the degree of certainty of the estimated time as a function of a degree of certainty of each of the indications of elapsed time.

Moreover in accordance with a preferred embodiment of the present invention the time-based query module is operative to determine the degree of certainty of the estimated time as an average of the degrees of certainty of the indications of elapsed time.

Further in accordance with a preferred embodiment of the present invention the time-based query module is operative to determine the degree of certainty of the estimated time as a weighted average of the degrees of certainty of the indications of elapsed time.

Still further in accordance with a preferred embodiment of the present invention the time-based query response module is operative to determine the estimated time also as a function of a degree of certainty of each of the indications of elapsed time.

Additionally in accordance with a preferred embodiment of the present invention the time-based query response module is operative to determine the degree of certainty of at least one of the indications of elapsed time such that the degree of certainty decreases as the at least one indication of elapsed time increases.

Moreover in accordance with a preferred embodiment of the present invention time-based query response module is operative to at least partially base the degree of certainty of each of the indications of elapsed time on historical data of the indications of elapsed time.

Further in accordance with a preferred embodiment of the present invention the time-based query response module is operative to determine the degree of certainty of at least one of the indications of elapsed time is based on learning user behavior.

Still further in accordance with a preferred embodiment of the present invention the time-based query module is operative to base at least one of the indications of elapsed time on a user-initiated event.

Additionally in accordance with a preferred embodiment of the present invention time-based query module is operative to determine the one indication of elapsed time as a function of a number of occurrences of the user-initiated event since the most recently updated time.

Moreover in accordance with a preferred embodiment of the present invention the time-based query module is operative to learn user behavior in relation to the user-initiated event, and adapt how the one indication of elapsed time is based on a number of occurrences of the user-initiated event.

Further in accordance with a preferred embodiment of the present invention time-based query module is operative to base the one indication of elapsed time on an average user behavior in relation to the user-initiated event.

Still further in accordance with a preferred embodiment of the present invention the user initiated event is a key stroke during a game.

Additionally in accordance with a preferred embodiment of the present invention the user initiated event is playing a media item.

Moreover in accordance with a preferred embodiment of the present invention the user initiated event is a power up or power down.

Further in accordance with a preferred embodiment of the present invention the time-based query response module is operative to determine the estimated time also as a function of a degree of certainty of each of the indications of elapsed time, wherein the degree of certainty of the one indication of elapsed time is based on learning user behavior in relation to the user-initiated event.

Still further in accordance with a preferred embodiment of the present invention the time-based query module is operative such that the function determining the estimated time adapts depending on which of a plurality of access control criteria are being employed to control access to the content.

There is also provided in accordance with still another preferred embodiment of the present invention a rights validator system for controlling access to content, the system including a query processor to receive a rights query and to provide a result to the rights query based on an estimated time, and a time-based query response module operationally connected to the query processor, the time-based query response module being operative to determine the estimated time as a function of a most recently updated time, and an indication of elapsed time since the most recently updated time, the indication of elapsed time being based on a user-initiated event.

Additionally in accordance with a preferred embodiment of the present invention time-based query module is operative to determine the indication of elapsed time as a function of a number of occurrences of the user-initiated event since the most recently updated time.

Moreover in accordance with a preferred embodiment of the present invention the time-based query module is operative to learn user behavior in relation to the user-initiated event, and adapt how the indication of elapsed time is based on a number of occurrences of the user-initiated event.

Further in accordance with a preferred embodiment of the present invention time-based query module is operative to base the indication of elapsed time on an average user behavior in relation to the user-initiated event.

Still further in accordance with a preferred embodiment of the present invention the user initiated event is a key stroke during a game.

Additionally in accordance with a preferred embodiment of the present invention the user initiated event is playing a media item.

Moreover in accordance with a preferred embodiment of the present invention the user initiated event is a power up or power down.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
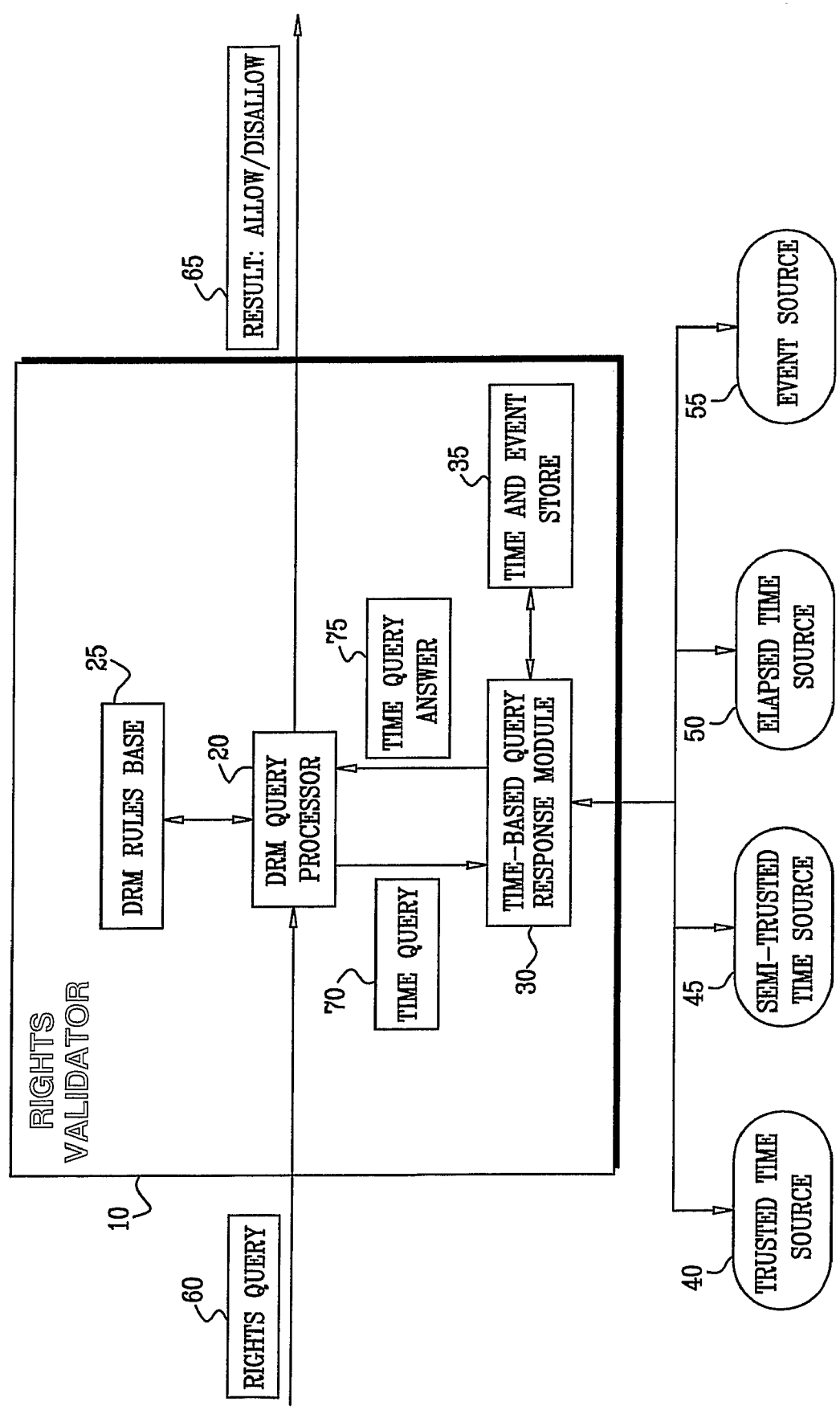
FIG. 1 is a simplified block diagram illustration of a time-based digital rights management system constructed and operative in accordance with a preferred embodiment of the present invention.

Reference is now made to FIG. 1, which is a simplified block diagram illustration of a time-based digital rights management system constructed and operative in accordance with a preferred embodiment of the present invention.

The system of FIG. 1 comprises a rights validator 10. The rights validator 10 preferably comprises a Digital Rights Management (DRM) query processor 20, associated with a DRM rules base 25 and with a time-based query response module 30. The Digital Rights Management (DRM) query processor 20 is operationally connected to the DRM rules base 25 and the time-based query response module 30.

The time-based query response module 30 is preferably associated with a time and event store 35. It is to be appreciated that the time and event store 35, which is depicted as separate from the time-based query response module 30, can be comprised in the time-based query response module 30.

The time-based query response module 30 is also preferably operatively associated with at least one of:
at least one trusted time source 40;
at least one semi-trusted time source 45;
at least one elapsed time source 50; and at least one event source 55.

The trusted time source 40 is preferably operative to provide a time stamp (not shown) in response to a time stamp request (not shown). The trusted time source 40 may also preferably be enabled to periodically provide a time stamp to the time-based query response module 30 without need for the time stamp request. The trusted time source 40 is preferably "trusted", that is, considered by persons setting up preferred embodiments of the present invention to provide the time stamp without the time stamp having been "spoofed" or "hacked". The time stamp is preferably digitally signed by the trusted time source 40, and is preferably uniquely associated with the time stamp request.

By way of a non-limiting example, the Online Certificate Status Protocol (OCSP) is a trusted time source 40. The OCSP provides, among other information, a digitally signed time stamp from a trusted certificate server (not shown).

The semi-trusted time source 45 preferably comprises a time source operative to provide a time stamp (not shown) in response to a time stamp request (not shown). The semi-trusted time source 45 may also preferably be enabled to periodically provide the time stamp to the time-based query response module 30 without need for the time stamp request. The semi-trusted time source 45 preferably provides the time stamp, but is not known to be trusted in the sense described above with reference to the trusted time source 40. The semi-trusted time source typically does not digitally sign the time stamp.

By way of a non-limiting example, an internal clock of a cell phone handset comprises a semi-trusted time source 40.

The elapsed time source 50 preferably comprises a timer which typically tracks elapsed time during active periods, and resets to zero when it is not active. The timer is not necessarily a device designed to provide time information formatted in time units such as seconds, minutes, hours and so on. The timer is generally a counter which increments in a monotonically increasing fashion, preferably incrementing substantially periodically. An elapsed time is preferably determined based on the value of the counter.

The elapsed time source 50 is preferably operative to provide the elapsed time (not shown) in response to an elapsed time request (not shown). The elapsed time source 50 preferably also sends the time-based query response module 30 an indication whenever the timer is reset to zero. The elapsed time source 50 may also preferably be enabled to periodically provide the elapsed time to the time-based query response module 30 without need for the elapsed time request.

Non-limiting examples of elapsed time sources 50 include a timer comprised in a memory card and a timer comprised in a SIM card. Such cards typically do not comprise a power source, and typically do not track elapsed time when not connected to the power source.

The event source 55 is preferably operative to provide an indication to the time-based query response module 30 whenever an event takes place, as well as to provide an indication in response to an event count request. A non-limiting example of an event source 55 is a counter comprised in a smart card, which increments whenever a DRM-protected video is accessed. The counter of the event source 55 is not typically a device designed to measure time: The counter of the event source 55 is typically a counter which increments in a monotonically increasing fashion. The data which the event source 55 sends to the time-based query response module 30 comprises at least the value of the counter of the event source 55.

The time and event sources 40, 45, 50, and 55, are preferably defined within the rights validator 10. If there is a need to change, add, and delete time and event sources, the change, addition, and deletion of the time and event sources preferably happens by a secure update of one of: code comprised in the rights validator 10; and data comprised in the rights validator 10.

A non-limiting example of a secure update is when the rights validator 10 runs digitally signed software, the running of the digitally signed software typically occurring in a computing environment which only allows running digitally signed software, signed by trusted authorities.

The operation of the system of FIG. 1 is now briefly described.

The rights validator 10 is preferably operative to: receive a rights query 60; and to provide a result 65 to the rights query 60 based on the current estimated time, in order to control access to content. By way of a non-limiting example, the rights query 60 typically comprises a query whether viewing, or other use, of a DRM-protected video is allowed based on the current estimated time. The result 65 typically comprises one of: "allow" and "disallow", expressed in any appropriate format.

The rights query 60 is preferably received by the DRM query processor 20. The DRM query processor 20 typically queries the DRM rules base 25, and receives a DRM rule associated with the DRM-protected video and the rights query 60, as is well known in the art of DRM. By way of a non-limiting example, the DRM rule may comprise a limitation that the DRM-protected video may only be used after a release date associated with the DRM-protected video has passed, the passing of the release date being associated with a desired degree of certainty. The DRM query processor 20 preferably sends a time query 70 to the time-based query module 30, the query comprising parameters, in any appropriate format, querying whether the release date has passed, with at least the desired degree of certainty.

The time-based query response module 30 preferably produces a time query answer 75, typically the current estimated time, based, at least in part, on heuristic methods appropriate for the time query 70 and data stored in the time and event store 35. The time-based query response module 30 sends the time query answer 75 to the DRM query processor 20, and the DRM query processor 20 produces a result 65, such as, for example, and without limiting the generality of the foregoing, "allow".

Therefore, the DRM query processor 20 is operative to: receive the rights query 60; and provide the result 65 to the rights query 60 based on the current estimated time provided by the time-based query response module 30. Most preferably, the DRM query processor 20 is operative to provide the result 65 based on the current estimated time and a degree of certainty of the estimated time, described in more detail with reference to FIG. 3.

The rights validator 10 is preferably constructed to be as tamper-resistant as possible, since security of the results 65 corresponds to the security of the rights validator 10. For the rights validator 10 to be as tamper-resistant as possible, it should be as hard as possible for hackers to access and modify data and internal operation of the rights validator 10. The rights validator 10 preferably comprises not only memory capacity, but computational capability as well. The rights validator 10 is preferably able to execute heuristics, and store DRM secrets and secret keys, locally, within the rights validator 10 internal circuitry. The rights validator 10 does not depend upon potentially vulnerable external resources for validating rights, and provides security to the overall system in which the rights validator 10 participates.

Figure 2:
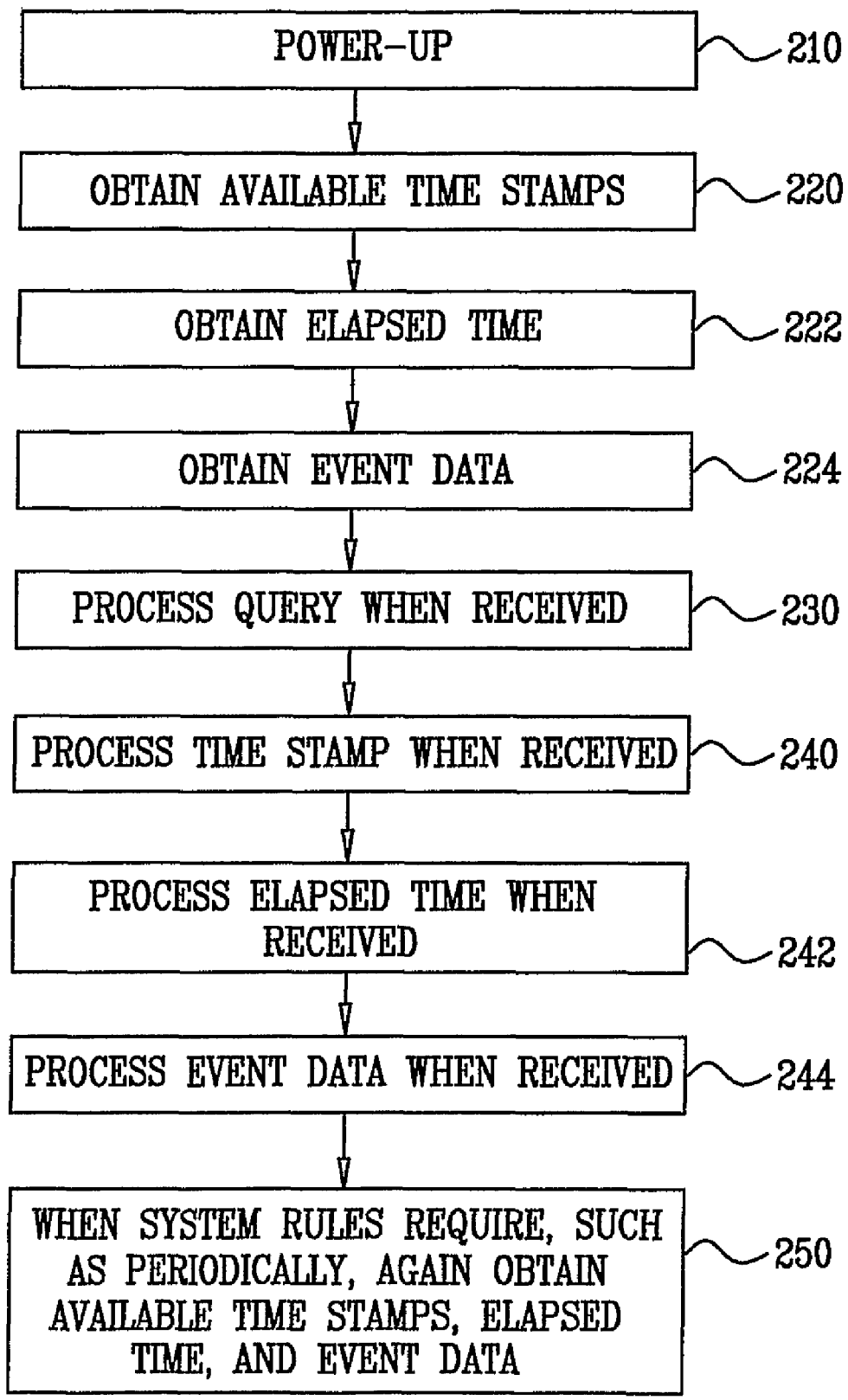
FIG. 2 is a simplified flowchart illustration of a preferred method of operation of the system of FIG. 1.

Reference is now made to FIG. 2, which is a simplified flowchart illustration of a preferred method of operation of the system of FIG. 1.

It is to be appreciated that when the system of FIG. 1 starts operating, the time and event store 35 does not typically comprise up-to-date data. The data stored in the time and event store 35 is typically not up-to-date prior to first operation within a DRM system, and the data is also typically not up-to-date after every time the system has been powered-down, or disconnected, from a power source.

On power-up (step 210), the system of FIG. 1 operates as described briefly below.

The time-based query response module 30 preferably sends a time stamp request (not shown) to each of the at least one trusted time source 40.

Upon receiving the time stamp (step 220) from the at least one trusted time source 40, the time-based query response module 30 preferably stores the time stamp and the at least one trusted time source 40 identification (ID) in the time and event store 35.

Whether or not the time stamp is received from the at least one trusted time source 40, a time stamp request is preferably sent to each of the at least one semi-trusted time source 45. Upon receiving the time stamp (step 220) from the semi-trusted time source 45, the time-based query response module 30 preferably stores the time stamp and the semi-trusted time source 45 ID in the time and event store 35.

Additionally, the time-based query response module 30 preferably updates additional data, by performing the following:

from each of the available elapsed time sources 50, obtaining the elapsed time data (step 222), and storing: the elapsed time; the elapsed time source ID; and the time stamp, in the time and event store 35; and from each of the available event sources, obtaining the count of events (step 224), and storing: the count of events, the event source ID; and the time stamp, in the time and event store 35.

It is to be appreciated that the steps 220, 222, and 224, may occur at any time after power-up (step 210), and not only in the order depicted in FIG. 2.

On receiving the time query 70, the time-based query response module 30 preferably processes the time query 70 (step 230), and preferably produces the time query answer 75. Processing the time query 70 is described in more detail with reference to FIG. 3 below.

It is to be appreciated that the step 230 may occur at any time after power-up (step 210), and not only in the order depicted in FIG. 2.

In order to remain up-to-date, the time-based query response module 30 is preferably operative to receive and process time stamps from the trusted time source 40 and from the semi-trusted time source 45, even without first sending the time stamp request.

When the time stamp is received from the trusted time source 40 and from the semi-trusted time source 45 (step 240), the time-based query response module 30 preferably performs the updating described above with reference to the step 220.

In an alternative preferred embodiment of the present invention, whenever the time stamp is received by the time-based query response module 30 from the trusted time source 40 and from the semi-trusted time source 45 (step 240), the time-based query response module 30 preferably attempts to obtain and record data from all the other sources 40, 45, 50, and 55 as described above with reference to the steps 220, 222, and 224.

In order to remain up-to-date, the time-based query response module 30 is preferably operative to receive and process elapsed time data from the elapsed time source 50, even without first sending an elapsed time request. When the elapsed time data is received by the time-based query response module 30 (step 242), the time-based query response module 30 preferably performs the updating described above with reference to the step 222.

In an alternative preferred embodiment of the present invention, whenever the elapsed time data is received by the time-based query response module 30 (step 242), the time-based query response module 30 preferably attempts to obtain and record data from all the other sources 40, 45, 50, and 55 as described above with reference to the steps 220, 222, and 224.

In order to remain up-to-date, the time-based query response module 30 is preferably operative to receive and process event data from the event source 55, even without first sending an event count request. When event data is received by the time-based query response module 30 (step 244), the time-based query response module 30 preferably performs the updating described above with reference to the step 224.

In an alternative preferred embodiment of the present invention, whenever the event data is received by the time-based query response module 30 (step 244), the time-based query response module 30 preferably attempts to obtain and record data from all the other sources 40, 45, 50, and 55 as described above with reference to the steps 220, 222, and 224.

It is to be appreciated that any one of the steps 240, 242, and 244 may occur at any time after power-up (step 210), and not only in the order depicted in FIG. 2.

The time-based query response module 30 preferably comprises system rules which keep the time-based query response module 30 up-to-date. By way of a non-limiting example, a system rule comprised in the time-based query response module 30 requires that the time-based query response module 30 attempt periodically to obtain and record data from all sources 40, 45, 50, and 55 as described above with reference to steps 220, 222, and 224 (step 250).

It is to be appreciated that upon disconnection from a power source, or power-down, the data stored in the time and event store 35 gradually becomes out-of-date.

Figure 3:
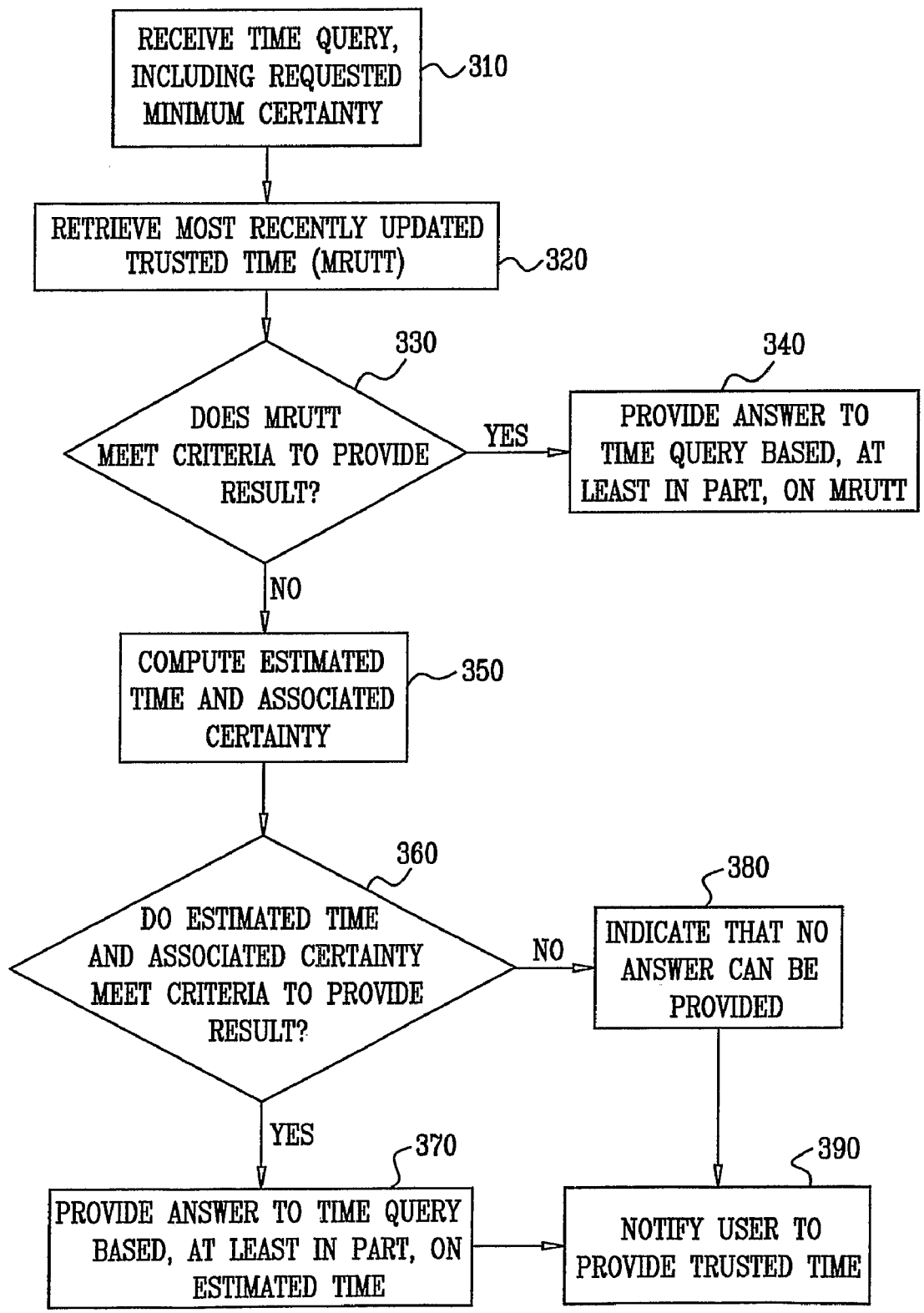
FIG. 3 is a simplified flowchart illustration of a preferred implementation of step 230 of FIG. 2.

Reference is now made to FIG. 3, which is a simplified flowchart illustration of a preferred implementation of step 230 of FIG. 2.

As described above with reference to FIG. 1, the time-based query response module 30 receives a time query 70 comprising parameters, in any appropriate format, querying whether the release date has passed, with at least the desired degree of certainty (step 310).

The time-based query response module 30 preferably first retrieves a most recently updated trusted time (MRUTT) from the time and event store 35 (step 320). The MRUTT is the time of the most recently updated time stamp from the at least one trusted time source 40. The MRUTT is associated with a trusted time source 40, therefore the MRUTT is associated with the highest degree of certainty.

It is to be appreciated that when more than one trusted time source 40 is available, the most recently updated trusted time is preferably used.

The time-based query response module 30 preferably evaluates whether the MRUTT meets criteria for providing the result (step 330). The subject of meeting criteria will be described in more detail below with reference to heuristics used by the time-based query response module 30.

By way of the above-mentioned example, a heuristic is used to evaluate whether the MRUTT meets criteria for providing the result. A degree of certainty criterion, associated with the desired degree of certainty, is perforce met, since the MRUTT is preferably associated with the highest degree of certainty. Preferably, a time criterion remains to be evaluated. If the MRUTT is later than the release date, then the time criterion is met, therefore both criteria are met, and the time-based query response module 30 preferably provides the time query answer 75 to the DRM query processor 20 (step 340).

If the MRUTT is not later than the release date, then the time criterion is not yet met, therefore an estimated time and an associated degree of certainty are preferably computed (step 350).

The time-based query response module 30 is preferably operative to determine the estimated time as a function of the MRUTT and indications of elapsed time, since the MRUTT, from one or more of the different sources 45, 50, and 55. The estimated time is preferably determined as the sum of the MRUTT plus an average of estimates of elapsed time, since the MRUTT, based on indications of elapsed time from a plurality of the sources 45, 50, and 55. It is to be appreciated that averaging the estimates from more than one source is likely to mitigate the effect of hackers interfering with one particular source. The average of estimates of elapsed time, since the MRUTT, based on indications of elapsed time from a plurality of the sources 45, 50, and 55 is preferably a weighted average based on a plurality of weights associated with each of the indications of elapsed time. The weighting of the sources 45, 50, and 55 is typically based on the degree of certainty of the indications of elapsed time from the respective sources 45, 50, and 55. Therefore, the estimated time is also determined as a function of the degree of certainty of each of the indications of elapsed time. The weighted average and weights are described in more detail with reference to FIG. 3. In case of the semi-trusted time source 45, the estimate of elapsed time since the MRUTT is simply a current time from the semi-trusted time source 45 less the time stored in the time and event store 35 at the last-trusted-time.

In case of the elapsed time source 50, the estimate of elapsed time since the MRUTT is a suitable conversion of a result of subtracting a value of the timer of the elapsed time source 50 stored in the time and event store 35 at the MRUTT from a current value of the timer of the elapsed time source 50.

In case of the event source 55, the estimate of elapsed time since the MRUTT is a suitable conversion of a result of subtracting a value of the counter of the event source 55 stored in the time and event store 35 at the last-trusted-time, from a current value of the counter of the event source 55. A preferable embodiment of the present invention performs the suitable conversion by multiplying the result by an average period of time between events of the event source 55.

It is to be appreciated that computing the average period of time between events of the event source 55 uses data stored in the time and event store 35. The time and event store 35 comprises time stamps and event counts which are associated with the event source 55. Computing the average period of time between events is done by dividing a difference between event counters by the difference between time stamps. The computing may occur periodically, as a system rule similar to the system rule of step 250 (FIG. 2), or the computation may occur as part of processing a time query.

The events of the event source 55 are typically user-initiated events, such that the time-based query response module 30 is preferably operative to determine one or more indications of elapsed time based on the event source 55 as a function of a number of occurrences of a user-initiated event or events since the MRUTT. The time-based query response module 30 is preferably operative to base the indication of elapsed time, in relation to the user-initiated event on average user behavior over a certain time period.

The time-based query response module 30 is preferably operative to learn user behavior in relation to a user initiated event and adapt how an indication of elapsed time is based on a number of occurrences of the user initiated event.

Typical user-initiated events include key strokes during a game, playing a media item such as a song or video, power up or power down. So for example, if over the last month the user always powers down once a day, then three power downs would be a good estimate for three days. However, if the user's behavior becomes more erratic, whereby power downs are sometimes every day and at other times every few days, the degree of certainty associated with the average user behavior is much lower than previously determined. Additionally, the average user behavior has changed. If the user behavior become steady again over a certain period of time, then the degree of certainty will again increase.

Therefore, the determination of an indication of elapsed time of a user-initiated event, and the degree of certainty associated with the indication, is typically based on learning user-behavior and adapting how the indication of elapsed time is based on the user-initiated event.

The estimated time is preferably computed, by the time-based query response module 30, as follows:

$$T_e = f_1(T_s, T_i(i=1,\ldots n)) \quad \text{(Equation 1)}$$

where:
$T_e$ is the estimated time;
$T_s$ is the MRUTT;
for $i=1,\ldots,n$, each $T_i$ is one of:
elapsed time, since $T_s$, from the at least one semi-trusted time source 45;
an estimate of elapsed time since $T_s$, for the at least one elapsed time source 50; and
an estimate of elapsed time since $T_s$, for the at least one event source 55; and
$f_1$ is a function which accepts as inputs the $T_s$ and the $T_i$, and provides as output the estimated time $T_e$.

A preferred embodiment of the present invention uses a weighted average for the function $f_1$, as follows:

$$T_e = T_s + \frac{1}{N} \sum_{i=1\ldots N} A_i T_i \quad \text{(Equation 2)}$$

where:
$T_e$ is the estimated time;
$T_s$ is the MRUTT;

$$\sum_{i=1\ldots N} A_i T_i$$

is a sum of estimates of elapsed time from the sources 45, 50, and 55;

for $i=1,\ldots,n$, each $T_i$ is one of:
elapsed time, since $T_s$, from the at least one semi-trusted time source 45;
an estimate of elapsed time since $T_s$, for the at least one elapsed time source 50; and
an estimate of elapsed time since $T_s$, for the at least one event source 55;
$A_i$ is a relative weight for the source i associated with $T_i$; and
N is the number of sources i which were used in the computation of $$\sum_{i=1\ldots N} A_i T_i.$$

It is to be appreciated that a different function $f_1$ can be used. The function $f_1$ is preferably selected based at least partly on a DRM rule to be applied. By way of a non-limiting example, when the DRM rule is of a type such as "do not allow use after user's subscription elapses", the function $f_1$ can alternatively be a maximum function. The maximum function provides the latest time from all the sources 45, 50, and 55. A hacker which tampers with some, but not all, of the time sources, in an attempt to "set back the time", may affect $T_e$ less when a maximum function is used than when a weighted average is used.

Therefore, the time-based query response module 30 is preferably operative such that the function determining the estimated time adapts depending in which access control criteria are being employed to control access to the content.

The degree of certainty associated with the estimated time is preferably computed, by the time-based query response module 30, as follows:

$$D = f_2(T_s, T_i(i=1,\ldots n)) \quad \text{(Equation 3)}$$

where:
D is the degree of certainty associated with the estimated time;
$T_s$ is the MRUTT;
for $i=1,\ldots,n$, each $T_i$ is one of:
elapsed time, since $T_s$, from the at least one semi-trusted time source 45;
an estimate of elapsed time since $T_s$, for the at least one elapsed time source 50; and
an estimate of elapsed time since $T_s$, for the at least one event source 55; and
$f_2$ is a function which accepts as inputs the $T_s$ and the $T_i$, and providing as output the degree of certainty associated with the estimated time D.

A preferred embodiment of the present invention uses a weighted average for the function $f_2$, as follows:

$$D = \frac{1}{N} \sum_{i=1\ldots N} B_i D_i(T_i) \quad \text{(Equation 4)}$$

where:
D is the degree of certainty associated with the estimated time;
for $i=1,\ldots,n$, each $T_i$ is one of:
elapsed time, since $T_s$, from the at least one semi-trusted time source 45;
an estimate of elapsed time since $T_s$, for the at least one elapsed time source 50; and an estimate of elapsed time since $T_s$, for the at least one event source 55;

$B_i$ is a relative weight for the source i associated with $T_i$;

$D_i(T_i)$ is typically a decreasing function of the $T_i$, the value of the decreasing function being a degree of certainty for the source i associated with the $T_i$, at a time $T_i$ (therefore, the degree of certainty decreases as the indication of elapsed time increases); and N is the number of sources i which were used in the computation of $$\sum_{i=1...N} B_i D_i(T_i).$$

Therefore, the time-based query response module 30 is preferably operative to determine the degree of certainty associated with the estimated time as a function (preferably an average, and most preferably a weighted average) of a degree of certainty of each of the indications of elapsed time from a plurality of the sources, 45, 50, and 55.

The time-based query response module 30 is preferably operative to at least partially base the degree of certainty of each of the indications of elapsed time on historical data of the indications of elapsed time, especially in relation to user-initiated event(s) where the degree of certainty is based on learning user behavior in relation to user-initiated event(s).

It is to be appreciated that the degree of certainty is preferably not expressed as an exact number, since the sources only provide approximate and semi-trusted time indications. The degree of certainty is preferably expressed as is well known in a field of art named "fuzzy logic". Fuzzy logic deals with uncertainty using membership in vaguely defined sets. Typical applications of fuzzy logic characterize sub-ranges of a continuous variable, such as for example, a continuous variable ranging from 0 to 1, corresponding to a range from "false" to "true". An odd number of sub-ranges, typically one of the odd numbers 5, 7, and 9, is typically used.

It is to be appreciated that the multiplier $A_i$ of Equation 2 and the relative weight value $B_i$ of Equation 4 are generally fixed for a specific combination of heuristic and available sources.

The time-based query response module 30 preferably evaluates whether the estimated time and the associated degree of certainty meet the criteria for providing the result (step 360).

If both the associated degree of certainty meets or exceeds the desired degree of certainty and the estimated time is such that an answer can be provided, then the time-based query response module 30 provides the time query answer 75 to the DRM query processor 20 (step 370).

If either the associated degree of certainty is less than the desired degree of certainty, or the estimated time is such that an answer cannot be provided, then the time-based query response module 30 provides the time query answer 75 to the DRM query processor 20 (step 380), conveying that an answer cannot be provided.

In an alternative preferred embodiment of the present invention the time-based query response module 30 sends a time stamp request to the trusted time source 40. If the trusted time source 40 provides the time stamp and the time stamp is different from the last-trusted-time, then the time-based query response module 30 restarts processing the time query 70 at step 320.

In yet another alternative preferred embodiment of the present invention a component comprised in the rights validator 10, such as, by way of a non-limiting example, either the time-based query response module 30 or the DRM query processor 20, provides notification to a user of the rights validator 10 to provide a connection to a trusted time source 40 (step 390).

Heuristics used by the time-based query response module 30 for processing time queries will now be briefly described, with reference to a table below. The table comprises examples of simple time queries, time and degree of certainty criteria for the queries, and describes heuristics for processing the queries according to FIG. 3.

|  | Criteria | | Heuristics for processing the query | | | |
| --- | --- | --- | --- | --- | --- | --- |
| Query | Time | Degree of certainty | Last-trusted-time | Step 330 criteria met? | Action after step 330 | Step 360 |
| Example 1 | "Not before T1" | Highest | After T1 | YES | step 340 | Not Applicable |
|  |  |  | Before T1 | NO | step 350 | Depends on result of step 350 |
| Example 2 | "Not after T1" | Medium | After T1 | YES | step 340 | Not Applicable |
|  |  |  | Before T1 | NO | step 350 | Depends on result of step 350 |
| Example 3 | "Between T1 and T2" | Low | After T2 | YES | step 340 | Not Applicable |
|  |  |  | After T1 and before T2 | NO | step 350 | Depends on result of step 350 |
|  |  |  | Before T1 | NO | step 350 | Depends on result of step 350 |

Example 1 is a typical time query with a criterion of "not before a time T1". The query of example 1 is typically associated with a highest degree of certainty, since the query of example 1 typically relates to blocking viewing prior to a specified release date.

If the last-trusted-time, retrieved from the time and event store 35, is after the time T1, then both the degree of certainty criterion and the time criterion are met, therefore step 330 criteria are met, and the time-based query response module 30 performs step 340 and provides an answer. The answer in this case causes the DRM query processor 20 to produce a result of "allow" thereby allowing viewing.

If the MRUTT is before the time T1, then it is not certain whether the time T1 has passed, therefore the time criterion is not met. The time-based query response module 30 performs step 350, estimating the time and the associated degree of certainty. The result of the following step 360 depends on the estimated time being not before the time T1 and the associated degree of certainty being equal to the highest degree.

Example 2 is another typical time query with a criterion of "not after a time T1". The query of example 2 is typically associated with a medium degree of certainty, since the query of example 2 typically relates to blocking viewing after an expiration date, while allowing viewing before the expiration date. Since viewing was already allowed, continued viewing somewhat past the expiration date is not typically considered as harshly as viewing before the release date.

If the last-trusted-time, retrieved from the time and event store 35, is after the time T1, then both the degree of certainty criterion and the time criterion are met, therefore step 330 criteria are met, and the time-based query response module 30 performs step 340 and provides an answer. The answer in this case causes the DRM query processor 20 to produce a result of "disallow" thereby blocking viewing.

If the MRUTT is before the time T1, then it is not certain whether the time T1 has passed, therefore the time criterion is not met. The time-based query response module 30 performs step 350, estimating the time and the associated degree of certainty. The result of the following step 360 depends on the estimated time being not before the time T1 and the associated degree of certainty being at least equal to the medium degree.

Example 3 is yet another typical time query with a criterion of "between a time T1 and a time T2". The query of example 3 may be, by way of a non-limiting example, associated with a low degree of certainty.

If the last-trusted-time, retrieved from the time and event store 35, is after the time T2, then both the degree of certainty criterion and the time criterion are met, therefore step 330 criteria are met, and the time-based query response module 30 performs step 340 and provides an answer. The answer in this case causes the DRM query processor 20 to produce a result of "disallow" thereby blocking viewing.

If the MRUTT is after the time T1 and before the time T2, then it is not certain whether the time T2 has passed, therefore the time criterion is not met. The time-based query response module 30 performs step 350, estimating the time and the associated degree of certainty. The result of the following step 360 depends on the estimated time being not before the time T1, and not after the time T2, and the associated degree of certainty being greater than or equal to the low degree of certainty.

If the MRUTT is before the time T1, then it is also not certain whether the time T2 has passed, therefore the time criterion is not met. The time-based query response module 30 performs step 350, estimating the time and the associated degree of certainty. The result of the following step 360 depends on the estimated time being not before the time T1, and not after the time T2, and the associated degree of certainty being greater than or equal to the low degree of certainty.

It is to be appreciated that in a case similar to example 3, where the time query comprises different times, such as T1 and T2, different degrees of certainty may be associated with the different times.

The present invention, in preferred embodiments thereof, is operative to adjust values of $A_i$ and $B_i$, the relative weights used in Equation 2 and Equation 4, respectively. As time goes by, the time-based query response module 30 collects data about the various time and event sources 45, 50, and 55, including data which serves to measure the quality of time estimates and degree of certainty.

By way of a non-limiting example, the time-based query response module 30 determines that a user listening to DRM protected music on the way back and forth to work, plays an average of 10 music songs per day, and the 10 music songs per day is an average associated with low variance. The time estimate (tracks played since the MRUTT)/10*24 is a good estimate for how much time has passed since the MRUTT, where "/" indicates division, and "*" indicates multiplication). The relative weights $A_i$ and $B_i$ are then adjusted to be higher, relative to the other time and event sources 45, 50, and 55.

It is to be appreciated that the relative weights $A_i$ and $B_i$ are typically adjusted after a certain number of trusted time updates. Optionally the relative weights $A_i$ and $B_i$ are adjusted every time there is a trusted time update.

It is appreciated that software components of the present invention may, if desired, be implemented in ROM (read only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A rights validator system for controlling access to content, the system comprising:
   a query processor to receive a rights query and to provide a result to the rights query based on an estimated current time when a trusted time source is unavailable; and
   a time-based query response module operationally connected to the query processor, the time-based query response module being operative to determine the estimated current time as a function of: a most recently updated time being a trusted time previously received from the trusted time source; and a plurality of indications of elapsed time since the most recently updated time, the elapsed time being the time between the most recently updated time and the current time, the indications of elapsed time being from a plurality of different sources of time indication such that each of the indications of elapsed time being based on a counter value of a different incrementing counter.

2. The system according to claim 1, wherein the most recently updated time is digitally signed.

3. The system according to claim 1, wherein the time-based query module is operative to determine the estimated current time as a function of: the most recently updated time; and an average of the indications of elapsed time since the most recently updated time.

4. The system according to claim 3, wherein the time-based query module is operative to determine the average of the indications as a weighted average based on a plurality of weights associated with each of the indications of elapsed time.

5. The system according to claim 4, wherein the time-based query module is operative to determine the weights based on a degree of certainty of each of the indications of elapsed time.

6. The system according to claim 1, wherein the query processor is operative to provide a result to the rights query based on the estimated current time and a degree of certainty of the estimated current time.

7. The system according to claim 6, wherein the time-based query module is operative to determine the degree of certainty of the estimated current time as a function of a degree of certainty of each of the indications of elapsed time.

8. The system according to claim 7, wherein the time-based query module is operative to determine the degree of certainty of the estimated current time as an average of the degrees of certainty of the indications of elapsed time.

9. The system according to claim 8, wherein the time-based query module is operative to determine the degree of certainty of the estimated current time as a weighted average of the degrees of certainty of the indications of elapsed time.

10. The system according to claim 1, wherein the time-based query response module is operative to determine the estimated current time also as a function of a degree of certainty of each of the indications of elapsed time.

11. The system according to claim 5, wherein the time-based query response module is operative to determine the degree of certainty of at least one of the indications of elapsed time such that the degree of certainty decreases as the at least one indication of elapsed time increases.

12. The system according to claim 5, wherein time-based query response module is operative to at least partially base the degree of certainty of each of the indications of elapsed time on historical data of the indications of elapsed time.

13. The system according to claim 5, wherein the time-based query response module is operative to determine the degree of certainty of at least one of the indications of elapsed time is based on learning user behavior.

14. The system according to claim 1, wherein the time-based query module is operative to base at least one of the indications of elapsed time on a user-initiated event.

15. The system according to claim 14, wherein time-based query module is operative to determine the one indication of elapsed time as a function of a number of occurrences of the user-initiated event since the most recently updated time.

16. The system according to claim 14, wherein the time-based query module is operative to: learn user behavior in relation to the user-initiated event; and adapt how the one indication of elapsed time is based on a number of occurrences of the user-initiated event.

17. The system according to claim 14, wherein time-based query module is operative to base the one indication of elapsed time on an average user behavior in relation to the user-initiated event.

18. The system according to claim 14, wherein the user initiated event is a key stroke during a game.

19. The system according to claim 14, wherein the user initiated event is playing a media item.

20. The system according to claim 14, wherein the user initiated event is a power up or power down.

21. The system according to claim 14, wherein the time-based query response module is operative to: determine the estimated current time also as a function of a degree of certainty of each of the indications of elapsed time, wherein the degree of certainty of the one indication of elapsed time is based on learning user behavior in relation to the user-initiated event.

22. The system according to claim 1, wherein the time-based query module is operative such that the function determining the estimated current time adapts depending on which of a plurality of access control criteria are being employed to control access to the content.

23. A rights validator system for controlling access to content, the system comprising:
a query processor to receive a rights query and to provide a result to the rights query based on an estimated current time when a trusted time source is unavailable; and
a time-based query response module operationally connected to the query processor, the time-based query response module being operative to determine the estimated current time as a function of: a most recently updated time being a trusted time received from the trusted time source; and an indication of elapsed time since the most recently updated time, the elapsed time being the time between the most recently updated time and the current time, the indication of elapsed time being based on a counter value of an incrementing counter, the indication of elapsed time being based on a user-initiated event.

24. The system according to claim 23, wherein time-based query module is operative to determine the indication of elapsed time as a function of a number of occurrences of the user-initiated event since the most recently updated time.

25. The system according to claim 23, wherein the time-based query module is operative to: learn user behavior in relation to the user-initiated event; and adapt how the indication of elapsed time is based on a number of occurrences of the user-initiated event.

26. The system according to claim 23, wherein time-based query module is operative to base the indication of elapsed time on an average user behavior in relation to the user-initiated event.

27. The system according to claim 23, wherein the user initiated event is a key stroke during a game.

28. The system according to claim 23, wherein the user initiated event is playing a media item.

29. The system according to claim 23, wherein the user initiated event is a power up or power down.

* * * * *